| United States Patent [19] | [11] Patent Number: 4,849,291 |
|---|---|
| Yacobucci et al. | [45] Date of Patent: Jul. 18, 1989 |

[54] MAGNETIC RECORDING ELEMENT

[75] Inventors: Paul D. Yacobucci, Rochester, N.Y.; Jesse T. Gerard, Las Vegas, Nev.; Pallassana V. Narayanan, Penfield, N.Y.

[73] Assignee: Eastman Kodak Company, Rochester, N.Y.

[21] Appl. No.: 127,812

[22] Filed: Dec. 2, 1987

[51] Int. Cl.[4] .............................................. G11B 5/64
[52] U.S. Cl. .................................. 428/422; 428/694; 428/695; 428/900
[58] Field of Search ............... 428/422, 421, 694, 695, 428/900

[56] References Cited

U.S. PATENT DOCUMENTS

| 3,778,308 | 12/1973 | Roller et al. | 117/234 |
|---|---|---|---|
| 3,810,874 | 5/1974 | Mitsch et al. | 260/75 |
| 4,232,072 | 11/1980 | Pardee | 428/65 |
| 4,267,238 | 5/1981 | Chernega | 428/422 |
| 4,321,404 | 3/1982 | Williams et al. | 560/115 |
| 4,368,239 | 1/1983 | Nakajima | 428/520 |
| 4,404,247 | 9/1983 | Domingues-Burguette et al. | 428/213 |
| 4,431,703 | 2/1984 | Somezawa et al. | 428/447 |
| 4,469,750 | 9/1984 | Fujiki et al. | 428/447 |
| 4,501,801 | 2/1985 | Kimura et al. | 428/447 |
| 4,526,833 | 7/1985 | Burguette et al. | 428/336 |
| 4,529,651 | 7/1985 | Kitoo et al. | 428/336 |
| 4,529,659 | 7/1986 | Hoshino | 428/422 |
| 4,583,145 | 4/1986 | Mönnich | 428/900 |
| 4,696,845 | 9/1987 | Yanagisawa | 428/421 |
| 4,711,809 | 12/1987 | Nishikawa | 428/421 |
| 4,713,287 | 12/1987 | Nishikawa | 428/421 |

*Primary Examiner*—Paul J. Thibodeau
*Attorney, Agent, or Firm*—Robert A. Gerlach

[57] ABSTRACT

A magnetic recording element comprises a polymeric film substrate on which is formed a thin CoNi recording layer. Over the latter is a protective layer of an acrylic copolymer of a perfluoroalkyl methanol ester of acrylic or methacrylic acid, preferably formed by plasma polymerization. The layer is tough, has a low coefficient of friction and protects the magnetic layer against corrosion.

8 Claims, No Drawings

MAGNETIC RECORDING ELEMENT

FIELD OF THE INVENTION

This invention relates to a magnetic recording element and more particularly to such an element having a particular kind of polymeric protective layer.

BACKGROUND OF THE INVENTION

Magnetic recording materials such as magnetic tapes and disks normally consist of a plastic support on which is formed a magnetic layer which can be a metallic layer or ferromagnetic particles dispersed in a binder resin. Over the magnetic layer a polymeric protective layer usually is formed. A wide range of polymers have been used or proposed for the protective layer.

Desirably, the protective layer has a low coefficient of friction in order that the magnetic head will have a minimum of resistance and will not be abraded when in contact with the magnetic recording element. The protective layer should also provide a moisture barrier and protect the magnetic layer against corrosion, a problem of particular importance with certain magnetic materials such as CoNi compositions, at high humidity. The protective layer should be physically tough in order to resist wear and transfer to the head when in contact with the magnetic head and to resist scratching and other physical damage. The protective layer should have these useful qualities, even though formed as a very thin layer, for the spacing between the magnetic layer and the head should be kept to a minimum.

Unfortunately, none of the presently used protective layers provide all of these qualities in the desired degree. Some are too high in coefficient of friction. Others do not provide an adequate moisture barrier to protect against corrosion and others are not tough enough for long wear.

A need has existed for a magnetic recording element having a protective layer which has, in a high degree, all of the desired qualities of low coefficient of friction, corrosion protection and toughness. In accordance with the present invention, a magnetic recording element is provided which has a protective layer having the desired qualities in a desirably high degree.

SUMMARY OF THE INVENTION

The magnetic recording element of the invention comprises a substrate, a magnetic recording layer formed on the substrate and a polymeric protective layer on the recording layer. The protective layer comprises a copolymer of acrylic or methacrylic acid with an acrylic or methacrylic ester of a perfluoroalkyl methanol.

DETAILED DESCRIPTION

The polymeric protective layer or overcoat for the magnetic recording layer in the elements of the present invention is formed of an acrylate or methacrylate copolymer in which a substantial portion of the acid groups have been esterified with an alcohol of which all but the α-hydrogens have been replaced with fluorine atoms. In other words, they are esterified with a perfluoroalkyl-substituted methanol. Preferably, the latter is of the formula $HO-CH_2-(-CF_2)_n-CF_3$, wherein n is from 2 to 12 and most preferably is from 2 to 5. The presence of α-hydrogen in the alcohol is important. Perfluorinated esters of similar structure, but lacking the α-hydrogens, have low hydrolytic stability and do not produce polymers having the moisture barrier and corrosion protection that characterize the polymers employed in the recording elements of the present invention.

The polymer is, in effect, a copolymer of an acrylic or methacrylic ester of such a perfluoroalkyl-substituted methanol with another monomer such as acrylic or methacrylic acid. In the copolymer the fluorinated ester component is the major component, preferably comprising from about 80 to about 99 weight percent and, most preferably, from about 85 to about 98 weight percent of the copolymer. These copolymers can be prepared by known methods of polymerizing acrylic monomers such as by conventional solution phase addition polymerization.

In the elements of the invention, the magnetic recording layer can be formed by coating the substrate or support with a composition comprising ferromagnetic particles dispersed in a polymeric binder such as a polyurethane resin. Recent improvements in the art have lead to elements in which a thin ferromagnetic metal or alloy film is deposited on the substrate by techniques such as vacuum evaporation, sputtering or electrochemical deposition. Oblique vacuum evaportion, with or without injection or oxygen, is a preferred deposition method.

The magnetic recording layer comprises a metal of Group VIII of the Periodic Table, i.e., iron, cobalt or nickel or an alloy of two or more of such metals, with or without other elements. Especially useful are alloys such as CoNi and CoCr, and such alloys containing small amounts of elements such as Pr and Dy. Although the layer can comprise a coating of metallic particles in a binder, it preferably is a thin metallic film. For thin metallic films the thickness can range for example, from about 0.05 to 0.2 μm. For a layer composed of magnetic particles in a binder resin the thickness can be, e.g., 1 to 5 μm. The substrate or support for the recording layer can be composed of a wide range of substances including polymers, ceramics and non-magnetic metals. Preferably, the substrate is a film of a polymer such as polyethylene terephthalate, polyimides, or the like in a thickness of, for example, from about 3 to 15 μm for tapes and considerably thicker, e.g., 75 μm or thicker for floppy disks and the like.

The examples which follow illustrate the preparation by solution polymerization of polymers which are useful as protective layers in the recording elements of the invention.

EXAMPLE 1

Polymerization of Poly
(1H,1H-Heptafluorobutylmethacrylate-co-methacrylic acid) (90/10 weight ratio)

A solution of 45 g of 1H,1H-heptafluorobutylmethacrylate, 5.0 g of methacrylic acid and 50 mL of nitrogen-sparged methyl ethyl ketone was purged with nitrogen. 2,2'-Azobis(2-methylpropionitrile) (0.25 g) was added and the solution was heated in a 65° C. bath under a nitrogen sweep for 17 hours. The solution was cooled to room temperaturefiltered, and bottled. The glass transition temperature of the resulting copolymer was measured as 102° C.

EXAMPLE 2

Polymerization of Poly(1H,1H-Pentadecafluorooctylacrylate-co-methacrylic acid (90/10)

A solution of 47.2 g of 1H,1H-pentadecafluorooctyl acrylate, 5.2 g of acrylic acid and 104 mL of nitrogen-sparged N,N-dimethylformamide was purged with nitrogen. 2,2'-Azobis(2-methylpropionitrile) (0.26 g) was added and the solution was heated in a 65° C. bath under nitrogen sweep for 17.5 hours. The solution was cooled to room temperature and poured into ether to precipitate the polymer which was isolated, rinsed again with ether, collected and dried. The yield of polymer was 43 g (82% conversion). The glass transition temperature was measured as 41° C.

The next example illustrates the preparation and testing of a magnetic recording element of the invention.

EXAMPLE 3

Coating and Evaluation of Poly[1H,1H-pentadecafluorooctyl acrylate-co-acrylic acid] (90/10) on Metal-Evaporated Tape Recording Element An oxygen containing CoNi thin ferromagnetic metal layer having a thickness of 0.15 μm was obliquely vacuum deposited with oxygen injection onto a polyester film base of 14 μm thickness. Samples of the metal coated film were overcoated with solution of poly(1H,1H-pentadecafluorooctyl acrylate-co-acrylic acid) (90/10 weight ratio) using a band coating doctor blade. The following three solution concentrations were employed to produce dry overcoat layer thicknesses of 0.002, 0.004, and 0.02 μm respectively:

(a) 0.5 g of polymer in 1 L of a 2:1 mixture of 1,1,2-trichloro-1,2,2-trifluoroethane and methyl ethyl ketone.
(b) Same as (a) but 0.1 g of polymer as in Example 1.
(c) Same as (a) but 0.05 g of polymer as in Example 1.

After coating, the samples were slit to tape width. One sample was employed as air dried, while the other was oven dried at 70° C. The characteristics of each layer were determined by measurement of the contact angle of water on the sample, as well as measuring the static coefficient of friction. Toughness was evaluated qualitatively by observation of surface damage resulting from friction measurements.

As compared with a control magnetic tape having a polymethacrylate overcoat, the tapes of the invention were markedly superior with regard to static coefficient of friction and water contact angle. Thus, for overcoat thicknesses ranging from 2 to 20 nm, the static coefficient of friction for tapes having a protective overcoat in accordance with the invention ranged from about 0.3 to 0.55 as compared with 0.76 to 0.82 for the control. The water contact angle for the tapes of the invention ranged from about 84° to 110° as compared with 60°-65° for the control, thus indicating a substantially superior moisture barrier property for the tapes of the invention.

The invention has been described in detail with particular reference to preferred embodiments thereof, but it will be understood that variations and modifications can be effected within the spirit and scope of the invention.

What is claimed is:

1. A magnetic recording element comprising a substrate, a magnetic recording layer on the substrate and a polymeric protective layer on the recording layer, said protective layer comprising a copolymer of acrylic or methacrylic acid with an acrylic or methacrylic ester of a perfluoroalkylmethanol.

2. An element of claim 1, wherein the ester is an ester of $HO-CH_2-(-CF_2)_n-CF_3$, wherein n is an integer of from 2 to 12.

3. An element of claim 1, wherein the magnetic recording layer is a CoNi metal evaporated layer.

4. An element of claim 1, wherein the polymeric protective layer comprises a copolymer of 1H,1H-heptafluorobutylmethacrylate with acrylic or methacrylic acid.

5. An element of claim 1, wherein the polymeric protective layer comprises a copolymer of 1H,1H-pentadecylfluorooctylacrylate with acrylic or methacrylic acid.

6. An element of claim 3, wherein the polymeric protective layer comprises poly(1H,1H-heptafluorobutylmethacrylate-co-methacrylic acid) (90/10).

7. An element of claim 3, wherein the polymeric protective layer comprises poly(1H,1H-pentadecafluorooctylacrylate-co-methacrylic acid) (90/10).

8. An element of claim 3, wherein the polymeric protective layer comprises poly(1H,1H-pentadecafluorooctylacrylate)-co-acrylic acid) (90/10).

* * * * *